US010737979B2

(12) United States Patent
Lu et al.

(10) Patent No.: US 10,737,979 B2
(45) Date of Patent: Aug. 11, 2020

(54) GYPSUM SET ACCELERATOR AND METHOD OF PREPARING SAME (71) Applicant: UNITED STATES GYPSUM COMPANY, Chicago, IL (US)

(72) Inventors: Runhai Lu, Wauconda, IL (US); Yijun Sang, Oak Park, IL (US); Weixin D. Song, Shanghai (CN)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 86 days.

(21) Appl. No.: 15/918,449

(22) Filed: Mar. 12, 2018

(65) Prior Publication Data

US 2018/0305257 A1    Oct. 25, 2018

Related U.S. Application Data (60) Provisional application No. 62/487,658, filed on Apr. 20, 2017.

(51) Int. Cl.
 *C04B 22/14*  (2006.01)
 *C04B 28/14*  (2006.01)
 (Continued)

(52) U.S. Cl.
 CPC ............ *C04B 22/143* (2013.01); *C04B 18/24* (2013.01); *C04B 20/026* (2013.01); *C04B 22/16* (2013.01);
 (Continued)

(58) Field of Classification Search
 CPC . C04B 22/143; C04B 28/145; C04B 40/0042; C04B 20/026; C04B 18/24;
 (Continued)

(56) References Cited

U.S. PATENT DOCUMENTS 2,078,199 A    4/1937 King
3,573,947 A    4/1971 Kinkade et al.
(Continued)

FOREIGN PATENT DOCUMENTS

CA    9993310 A    11/1976
CN    1133601 C    1/2004
(Continued)

OTHER PUBLICATIONS

Joseph J. Assaad and Salim E. Asseily, Use of Water Reducers to Improve Grindability and Performance of Portland Cement Clinker, International Concrete Abstracts Portal, URL: <https://www.concrete.org/publications/internationalconcreteabstractsportal.aspx?m=details&ID=51683465>, retrieved from the Internet, Oct. 26, 2016.
(Continued)

*Primary Examiner* — Michael N Orlando
*Assistant Examiner* — Christopher W Raimund
(74) *Attorney, Agent, or Firm* — Vorys, Sater, Seymour and Pease LLP; Pradip Sahu; Philip T. Petti (57) ABSTRACT A modified gypsum set accelerator and a method of preparing the same is provided, which includes dry loose finely ground particles of a mixture of ground dry calcium sulfate dihydrate and a grinding aid selected from one or more of beta-naphthalene sulfonate formaldehyde condensate, trimetaphosphate phosphate salt, tripolyphosphate salt, tetra-pyrophosphate salt, and pregelatinized starch.

15 Claims, 5 Drawing Sheets (51) Int. Cl.
*C04B 24/22* (2006.01)
*C04B 22/16* (2006.01)
*C04B 18/24* (2006.01)
*C04B 24/38* (2006.01)
*C04B 20/02* (2006.01)
*C04B 40/00* (2006.01)
*C04B 111/00* (2006.01)
*C04B 103/12* (2006.01)
*C04B 103/52* (2006.01)

(52) U.S. Cl.
CPC .......... *C04B 24/226* (2013.01); *C04B 24/383* (2013.01); *C04B 28/14* (2013.01); *C04B 28/145* (2013.01); *C04B 40/0042* (2013.01); *C04B 2103/12* (2013.01); *C04B 2103/52* (2013.01); *C04B 2111/0062* (2013.01)

(58) Field of Classification Search
CPC ....... C04B 22/16; C04B 24/226; C04B 28/14; C04B 24/383; C04B 2103/52; C04B 2111/0062; C04B 2103/12
See application file for complete search history.

(56) References Cited

U.S. PATENT DOCUMENTS

| | | | |
|---|---|---|---|
| 3,813,312 A | 5/1974 | Kinkade et al. | |
| 3,870,538 A | 3/1975 | Burkard et al. | |
| 4,019,920 A * | 4/1977 | Burkard ................. | C04B 28/14 |
| | | | 106/780 |
| 4,059,456 A | 11/1977 | Derooy et al. | |
| 4,298,394 A | 11/1981 | Leeming et al. | |
| 5,207,830 A * | 5/1993 | Cowan ................. | A01K 1/0154 |
| | | | 106/672 |
| 5,320,677 A | 6/1994 | Baig | |
| 6,221,151 B1 | 4/2001 | Campbell et al. | |
| 6,409,824 B1 | 6/2002 | Veeramasuneni et al. | |
| 6,409,825 B1 * | 6/2002 | Yu ......................... | C04B 28/14 |
| | | | 106/772 |
| 7,413,603 B2 | 8/2008 | Miller et al. | |
| 8,197,952 B2 | 6/2012 | Yu et al. | |
| 8,262,820 B2 | 9/2012 | Yu et al. | |
| 2005/0241539 A1 | 11/2005 | Hagen et al. | |
| 2005/0241540 A1 | 11/2005 | Hohn et al. | |
| 2005/0241541 A1 | 11/2005 | Hohn et al. | |
| 2005/0241542 A1 | 11/2005 | Hagen et al. | |
| 2005/0241543 A1 | 11/2005 | Hagen et al. | |
| 2006/0243171 A1 | 11/2006 | Yu et al. | |
| 2007/0251628 A1 | 11/2007 | Yu et al. | |
| 2009/0273113 A1 | 11/2009 | Baig | |
| 2012/0090508 A1 * | 4/2012 | Groza ................... | C04B 11/002 |
| | | | 106/778 |
| 2012/0216724 A1 * | 8/2012 | Nicoleau ................ | C04B 28/02 |
| | | | 106/808 |
| 2014/0113124 A1 | 4/2014 | Sang et al. | |
| 2014/0303289 A1 | 10/2014 | Muller et al. | |

FOREIGN PATENT DOCUMENTS

| | | | | |
|---|---|---|---|---|
| CN | 100406405 C | 7/2008 | | |
| CN | 102276228 A | 12/2011 | | |
| CN | 102503212 B | 6/2013 | | |
| EP | 1874705 | 1/2008 | | |
| EP | 1874706 | 1/2008 | | |
| EP | 2607332 A1 | 6/2013 | | |
| RU | 2070170 C1 | 3/1975 | | |
| RU | 2070170 C1 * | 12/1996 | ............. | C04B 28/16 |
| RU | 2151114 C1 * | 6/2000 | ............. | C04B 24/20 |
| WO | 9721637 A1 | 6/1997 | | |
| WO | 1997021637 A1 | 6/1997 | | |
| WO | WO-9908978 A1 * | 2/1999 | ............. | C04B 22/16 |
| WO | 2006115496 A1 | 11/2006 | | |
| WO | 2006115497 A1 | 11/2006 | | |

OTHER PUBLICATIONS

Lomar® D Powder, Polynaphthalene Sulfonate, Sodium Salt Concrete Superplasticizer Powder, GEO® Specialty Chemicals, Aug. 15, 2013.

International Search Report and Written Opinion dated Aug. 8, 2018 for PCT/US2018/028466 to United States Gypsum Company filed Apr. 20, 2018.

* cited by examiner

GYPSUM SET ACCELERATOR AND METHOD OF PREPARING SAME

CROSS-REFERENCE TO RELATED APPLICATION

This claims the benefit of United Stated provisional patent application No. 62/487,658, entitled GYPSUM SET ACCELERATOR AND METHOD OF PREPARING SAME, filed Apr. 20, 2017.

FIELD OF THE INVENTION

The present invention relates to a method and a composition for accelerating the setting reaction of an aqueous calcined gypsum slurry to form gypsum-containing products, as well as a method for preparing and using the composition. More particularly, the invention relates to a modified gypsum set accelerator composition reducing cost and process steps in preparing a gypsum/fiber board, and a method for preparing and using the composition.

BACKGROUND OF ART

Freshly mined gypsum is known as landplaster. It includes calcium sulfate dihydrate, and is also known plaster or terra alba. In many deposits, landplaster includes at least 50% by weight calcium sulfate dihydrate. Synthetic gypsum may also be known as Landplaster. Synthetic gypsum is a sulfate material that results from the flue gas desulfurization (FGD) or "scrubbing" process at coal-fired power plants. Calcining the calcium sulfate dihydrate at temperatures above 150° C. drives off part of the water of hydration, forming calcium sulfate hemihydrate, also known as calcined gypsum, stucco, Plaster of Paris, calcium sulfate hemihydrate or calcium sulfate half-hydrate. When added to water, calcium sulfate hemihydrate crystallizes with the water to reform the dihydrate. As the reaction proceeds, an interwoven matrix of calcium sulfate dihydrate crystals forms and becomes hard. The reaction is represented by the formula: $CaSO_4 \cdot \frac{1}{2}O + 3/2 H_2O \rightarrow CaSO_4 \cdot 2H_2O$.

Many substances are known to accelerate the hydration rate of calcium sulfate hemihydrate hydration. Set time is determined by one of two mechanisms. There is an initial delay or induction period while a few "starter" crystals are formed. After this induction period, the rate of reaction increases to a standard rate. Most set accelerators increase the hydration rate. For example, most sulfate compounds act as set accelerators according to LeChatlier's principle. Few substances are known to reduce the induction period. The most well-known of these is calcium sulfate dihydrate.

Mined, unground landplaster is ineffective as a set accelerator for hydration reactions. Grinding calcium sulfate dihydrate exposes fresh nucleation sites that speed formation of the dihydrate gypsum. Exposure to humidity deactivates the nucleation sites in as little as a few hours. To preserve the active surfaces, it is known to treat ground calcium sulfate dihydrate with a carbohydrate, such as sugar, to prevent oxidation. When added to a slurry of calcined gypsum and water, the carbohydrate quickly dissolves and exposes the active crystal sites. The active crystal sites act as "seed" crystals that facilitate formation of calcium sulfate dihydrate crystals in an interlocking matrix.

Examples of coated calcium sulfate are heat resistant accelerator (HRA) and climate stabilized accelerator (CSA), described in U.S. Pat. Nos. 2,078,199 and 3,573,947, respectively. U.S. Pat. Nos. 2,078,199 and 3,813,312 disclose when sugar or soluble dextrin are ball-milled together with the calcium sulfate dihydrate, the material functions to prevent dehydration of the accelerator, even when subjected to various atmospheric conditions on storage. Dextrins are a group of low-molecular-weight carbohydrates produced by the hydrolysis of starch or glycogen. Dextrins are mixtures of polymers of D-glucose units linked by $\alpha$-(1→4) or $\alpha$-(1→6) glycosidic bonds. Additionally, U.S. Pat. No. 3,870,538 discloses starch may be finely ground together with calcium sulfate dihydrate to serve as a preservative of the accelerator. U.S. Pat. No. 4,019,920 describes a gypsum set accelerator produced by compression milling a mixture of ground gypsum rock and starch, and the addition thereof to an aqueous slurry of settable calcined gypsum such as in the forming of paper-covered gypsum wallboard. Corn starch is preferably used in this reference. U.S. Pat. No. 6,221,151 describes a composition for accelerating the setting reaction of an aqueous calcined gypsum slurry including a vibratory ball milled mixture of calcium sulfate dihydrate and a surfactant. U.S. Pat. No. 6,221,151 discloses suitable surfactants for use in its invention include, but are not limited to, anionic, cationic, nonionic surfactants, and mixtures thereof. Suitable anionic surfactants include, but are not limited to, linear alkylate sulfonates such as sodium alkylbenzene sulfonates and sodium lauryl sulfates. Suitable cationic surfactants include, but are not limited to, starches, such as corn starch, acid-modified corn starch, grain starch, pearl starch (i.e., an unmodified raw starch), wheat starch, and acid-modified wheat starch. Suitable nonionic surfactants include, but are not limited to, ethoxylated nonylphenols. Generally, suitable starches include those which, when dispersed with a wet, set gypsum slurry core, will migrate to the core-to-paper cover sheet interface during drying and provide a strong bond at the interface between the core and paper cover sheet.

While these additives for accelerators have benefits, these materials, particularly dextrin, sugar, e.g., corn sugar, dextrose, glucose, sucrose, or other sugar are very expensive.

Another known accelerator is described in U.S. Pat. No. 6,409,825. This accelerator, termed a wet accelerator, includes ground calcium sulfate dihydrate in water with at least one additive selected from an organic phosphonic compound, a phosphate-containing compound or mixtures thereof. As with CSA and HRA, the gypsum particles act to accelerate the initial crystallization during the hydration reactions. This particular wet accelerator exhibits substantial longevity and maintains its effectiveness over time such that the wet gypsum accelerator can be made, stored, and even transported weeks or months after its manufacture. The wet gypsum accelerator is used in amounts ranging from about 5 to about 80 pounds per thousand square feet (24.3 to 390 g/m2) of board product. Another wet accelerator is described in WO 2006/115496, which is formed by grinding calcium sulfate dihydrate, water and a phosphate additive, e.g., pyrophosphate, tripolyphosphate, or trimetaphosphate.

Another known accelerator is described in U.S. Pat. No. 4,298,394. This accelerator comprises a milled composition of gypsum and sodium alkylbenzene sulphonate (up to 20 wt. % of the gypsum) added to an aqueous slurry of stucco to prepare a set gypsum. U.S. Pat. No. 4,059,456 describes a composition made up of finely ground calcium sulphate dihydrate and lignosulphonate, a waste product derived from the sulphite pulping of wood. Canadian Pat. No. 999,310 describes a fine particulate intimate admixture of gypsum and a long chain fatty carboxylic acid containing at least 12 carbon atoms, or a salt thereof.

WO 1997/021637 describes naphthalene sulfonate as a grinding aid but it was used in a Portland cement composition, not a gypsum composition.

Pregelatinized starch has been used in making gypsum wallboard. In this regard, U.S. Pat. No. 8,262,820 describes a gypsum-containing slurry including stucco and an aqueous pre-dispersion of a pregelatinized starch, as well as a method of making gypsum wallboard by providing a pre-dispersion of the pregelatinized starch in water, and adding the pregelatinized starch pre-dispersion to the gypsum-containing slurry. The pregelatinized starch can have a particle size distribution within the following range: d (0.1)=about 20µ-35µ, d (0.5)=about 60µ-110µ, d (0.9)=about 100µ-220µ. It discloses pregelatinized corn starch ground to specific particle size ranges to be pre-dispersed in water and added to a stucco-containing slurry, and discloses an accelerator made from dry grinding of gypsum with additives, such as sugar, dextrose, boric acid, and starch added to the stucco-containing slurry. However, it does not disclose co-grinding of pregelatinized starch with gypsum to make an accelerator.

It will be appreciated that this background description has been created by the inventors to aid the reader and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims and not by the ability of any disclosed feature to solve any specific problem noted herein. Thus, there is a continuing need for new and improved set gypsum-containing products and compositions used in preparing the products, particularly set accelerators, as well as methods for producing them, that solve, avoid, or minimize a problem noted above, and/or improves properties of the products.

SUMMARY OF THE INVENTION

One aspect of the present invention relates to a modified gypsum set accelerator comprising dry (water free) loose finely ground solid particles, which comprises a mixture of ground dry calcium sulfate dihydrate and a grinding aid comprising one or more of beta-naphthalene sulfonate formaldehyde condensate, trimetaphosphate phosphate salt, tripolyphosphate salt, tetra-pyrophosphate salt, and pregelatinized starch. The grinding aid is provided as dry loose solid particles. The dry calcium sulfate dihydrate and the grinding aid are co-ground to produce the modified gypsum set accelerator. Of the beta-naphthalene sulfonate formaldehyde condensates the calcium and/or sodium salts are preferred, and the sodium salt is the most preferred. In the gypsum industry the acronym for beta-naphthalene sulfonate formaldehyde condensate sodium salt is BNS. The trimetaphosphate salts, tripolyphosphate salts, tetra-pyrophosphate salts are inorganic phosphate salts. Typically the inorganic phosphate salts are ammonium, alkali metal or alkaline metal salts. Preferably the inorganic phosphate salts are sodium, potassium or calcium salts. Sodium trimetaphosphate (STMP), sodium tripolyphosphate (STPP), potassium tripolyphosphate (KTPP), tetrasodium pyrophosphate (TSPP), or tetrapotassium pyrophosphate (TKPP) are more preferred. STMP is the most preferred phosphate. The dry (water free) loose finely ground solid particles typically have an absence of calcium sulfate hemihydrate prior to being added as set accelerator to calcium sulfate hemihydrate slurry.

The grinding aid may be a combination of beta naphthalene sulfonate formaldehyde condensate, trimetaphosphate phosphate, tripolyphosphate, tetra-pyrophosphate, and/or pregelatinized starch, with other conventionally used materials. The grinding aid may be used in an amount to replace dextrose used in conventional accelerator, or in a greater amount if necessary. The grinding aid may have an absence of dextrose, or it may comprise dextrose in a very low level, for example, in an amount equal to less than 50 wt % or less than 25 wt. % of the total amount of the naphthalene sulfonate, phosphate, and/or pregelatinized starch. For example, the grinding aid may comprise less than 0.1 wt. % dextrose based on the weight of the dry calcium sulfate dihydrate Another aspect of the present invention relates to a method of preparing the gypsum set accelerator described above, comprising co-grinding dry calcium sulfate dihydrate with a grinding aid comprising one or more of one or more of the above discussed beta-naphthalene sulfonate formaldehyde condensate, trimetaphosphate phosphate salts, tripolyphosphate salts, tetra-pyrophosphate salts, and pregelatinized starch. The co-grinding may be performed by ball milling. The dry calcium sulfate dihydrate and the grinding aid are co-ground to a desired particle size prior to use.

The resulting set accelerator may be stored for extended periods and subsequently added to the gypsum slurry. The accelerator is relatively inexpensive and reduces process steps for preparing gypsum-containing products, e.g., gypsum board or fiber board, producing the products with excellent properties, including excellent strength, because the grinding aid according to the present invention is relatively inexpensive as compared to conventionally used dextrose, among others.

Beta-naphthalene sulfonate formaldehyde condensate, trimetaphosphate phosphate salts, tripolyphosphate salts, tetra-pyrophosphate salts, and/or pregelatinized starch are conventionally used in a process for gypsum board formation by being added to gypsum slurry in a mixer. However, they were not in the set accelerator being added to gypsum slurry in the mixer. Thus, the set accelerator was added to the mixer as one ingredient and the beta-naphthalene sulfonate formaldehyde condensate, phosphate, and/or pregelatinized starch were added as a separate ingredient. A benefit of the invention is that by using naphthalene sulfonate, phosphate, and/or pregelatinized starch to make the accelerator, the separate downstream step of adding beta-naphthalene sulfonate formaldehyde condensate, trimetaphosphate phosphate, tripolyphosphate, tetra-pyrophosphate, and/or pregelatinized starch can be avoided and thus simplify the process. In other words the beta-naphthalene sulfonate formaldehyde condensate, phosphate, and/or pregelatinized starch can do two functions, namely function as a grinding aid to make the accelerator and later downstream perform their normal function.

Another aspect of the present invention is a method comprising mixing water, calcium sulphate hemihydrate, and the gypsum set accelerator described above to form an aqueous slurry (gypsum slurry) and accelerate setting of the calcium sulphate hemihydrate (calcined gypsum). The method may further comprise depositing the aqueous slurry on a paper sheet and allowing the aqueous slurry to set, thereby obtaining a gypsum board, and may further comprises adding a cellulosic fiber in the slurry mixture to form a fiber board.

Advantages of the present invention may become apparent to those skilled in the art from a review of the following detailed description, taken in conjunction with the examples, and the appended claims. It should be noted, however, that while the invention is susceptible of embodiments in various forms, described hereinafter are specific embodiments of the invention with the understanding that the present disclosure is intended as illustrative, and is not intended to limit the invention to the specific embodiments described herein.

DETAILED DESCRIPTION OF THE INVENTION

As used herein, the term, "calcined gypsum", is intended to refer to alpha calcium sulfate hemihydrate, beta calcium sulfate hemihydrate, water-soluble calcium sulfate anhydrite, or mixtures of any or all thereof. The terms, "set gypsum" and "hydrated gypsum", are intended to refer to calcium sulfate dihydrate. The water in the mixture reacts spontaneously with the calcined gypsum to form set gypsum.

As used herein, the term "dry loose finely ground particles" is intended to refer to ground particles in dry condition (without mixing with water) and having a certain average particle size distribution.

All percentages and ratios used herein are by weight unless otherwise indicated.

Modified Set Accelerator

Figure 1:
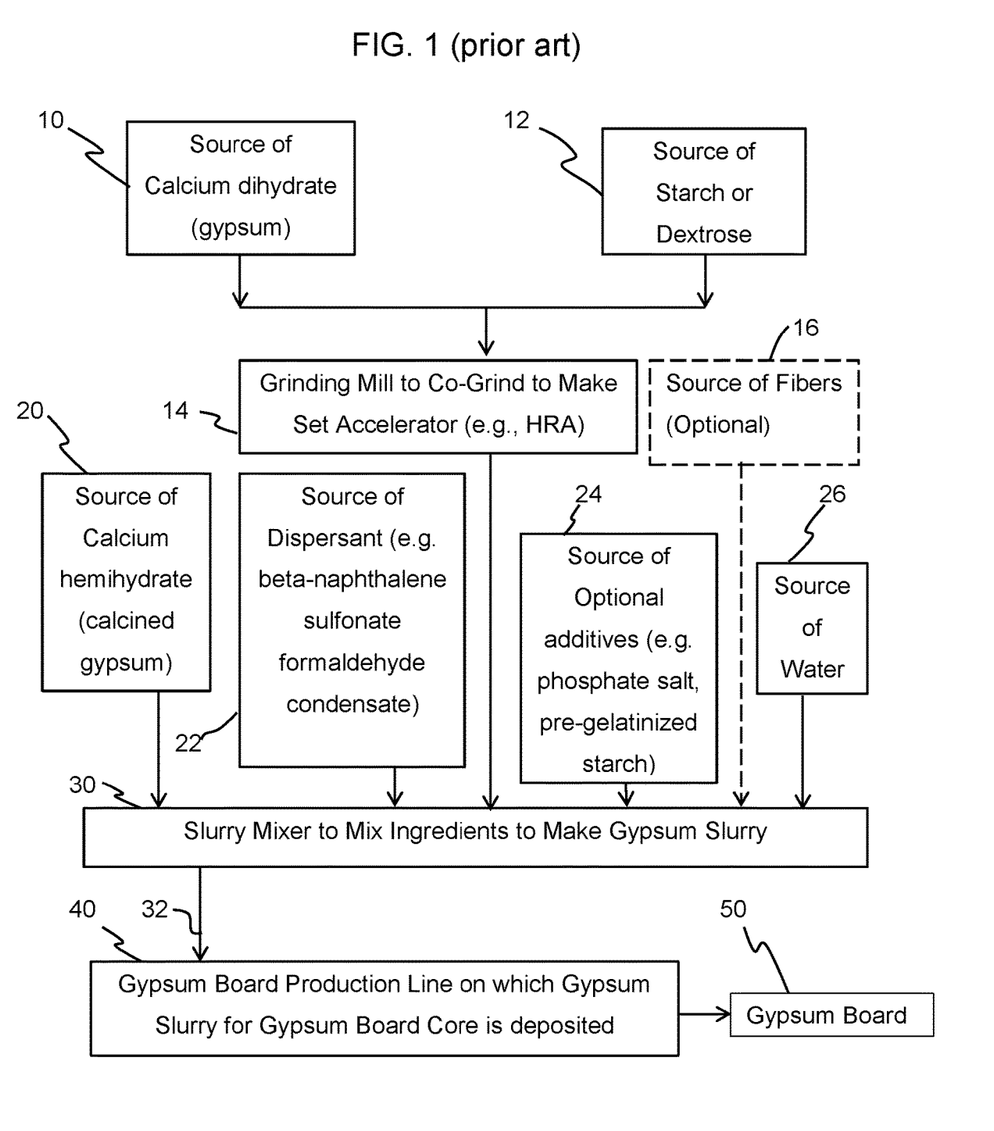
FIG. 1 shows a flow chart for a conventional process to prepare a gypsum-containing product using a conventional accelerator (e.g., dextrose based HRA).

Conventionally as shown in FIG. 1 the beta-naphthalene sulfonate formaldehyde condensate, phosphate salt, e.g., sodium trimetaphosphate (STMP), and/or pregelatinized starch would have been fed to gypsum slurry as one additive stream. The beta-naphthalene sulfonate formaldehyde condensate was fed to the gypsum slurry as a dispersant to reduce the mixing water in the slurry stage. The sodium or potassium trimetaphosphate phosphate, tripolyphosphate salt, or tetra pyrophosphate salt, particularly sodium trimetaphosphate (STMP), was conventionally fed to the gypsum slurry to enhance gypsum board strength. The pre-gelatinized starch would have been fed to gypsum slurry to improve the properties of the gypsum boards to make them stronger and lighter. In particular, the pregelatinized starch would have been fed to gypsum slurry to increase dry strength of gypsum products (particularly in wallboard). However, the conventional set accelerator comprising dextrose or starch would have been fed to the gypsum slurry as another additive stream.

Figure 2:
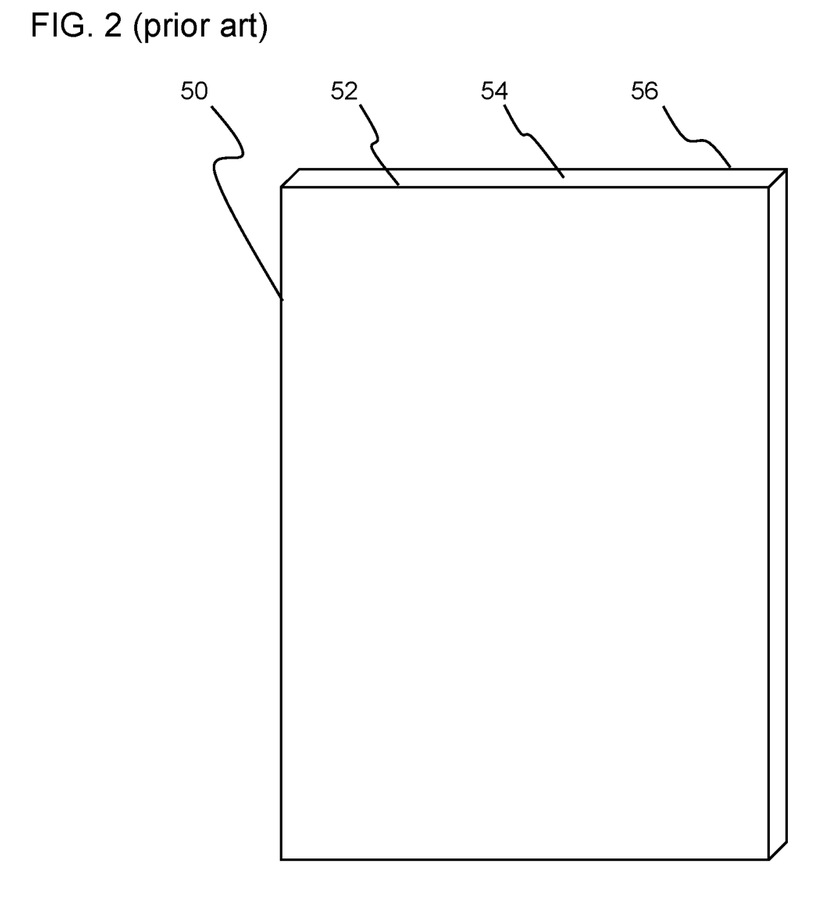
FIG. 2 shows a conventional gypsum board made from a gypsum slurry according to the process of FIG. 1.

In contrast, the present invention provides a gypsum set accelerator comprising dry loose finely ground particles, comprising a mixture of ground dry calcium sulfate dihydrate and a grinding aid comprising one or more of beta-naphthalene sulfonate formaldehyde condensate, trimetaphosphate, tripolyphosphate, tetra-pyrophosphate, and pre-gelatinized starch. The modified accelerator according the present invention is prepared by replacing some or all of conventionally used dextrose or starch in a conventional accelerator containing finely ground gypsum and the dextrose or starch, with a grinding aid comprising one or more of beta-naphthalene sulfonate formaldehyde condensate, phosphate salt (e.g., STMP), pre-gelatinized starch, as shown in FIG. 2.

The invention adds the additives to gypsum (landplaster) as a grinding aid earlier in the gypsum board making process than conventional to form a co-ground set accelerator. It was found that when the gypsum is co-ground together with at least one additive selected from one or more of beta-naphthalene sulfonate formaldehyde condensate, trimetaphosphate salts, tripolyphosphate salts, tetra-pyrophosphate salts, and pregelatinized starch, the additive functions not only as a grinding aid to prevent conglomeration of the fine particles, but also functions later in the gypsum board making process as a dispersant and/or to improve core strength of the gypsum-containing products. This reduces or avoids the cost of expensive conventional grinding aids, such as dextrose.

Also, the use of the selected additives as grinding aids is beneficial because they are fed to gypsum slurry in a gypsum slurry mixer for a gypsum board manufacturing process as part of the accelerator rather than and a separate additive stream. Thus, the method of the invention avoids having to add two additives in two steps.

Beta-Naphthalene Sulfonate Formaldehyde Condensate

Poly-Naphthalene sulfonates ("PNS") of the invention are beta-naphthalene sulfonate formaldehyde condensates (BNS). These condensates are salts, typically potassium, sodium or calcium salts, preferably sodium or calcium salts, most preferably sodium salts. The beta-naphthalene sulfonate formaldehyde condensate is a condensation product of a naphthalene sulfonate (typically 2-naphthalene sulfonate) and formaldehyde. In other words it is a polymer of a naphthalene sulfonate (typically 2-naphthalene sulfonate) and formaldehyde. In the gypsum industry the acronym for beta-naphthalene sulfonate formaldehyde condensate sodium salt is BNS. An example of BNS is known by the brand name LOMAR® D.

The beta-naphthalene sulfonate formaldehyde condensates have been known for use downstream in a gypsum board production process as a dispersant for the gypsum slurry.

Figure 3:
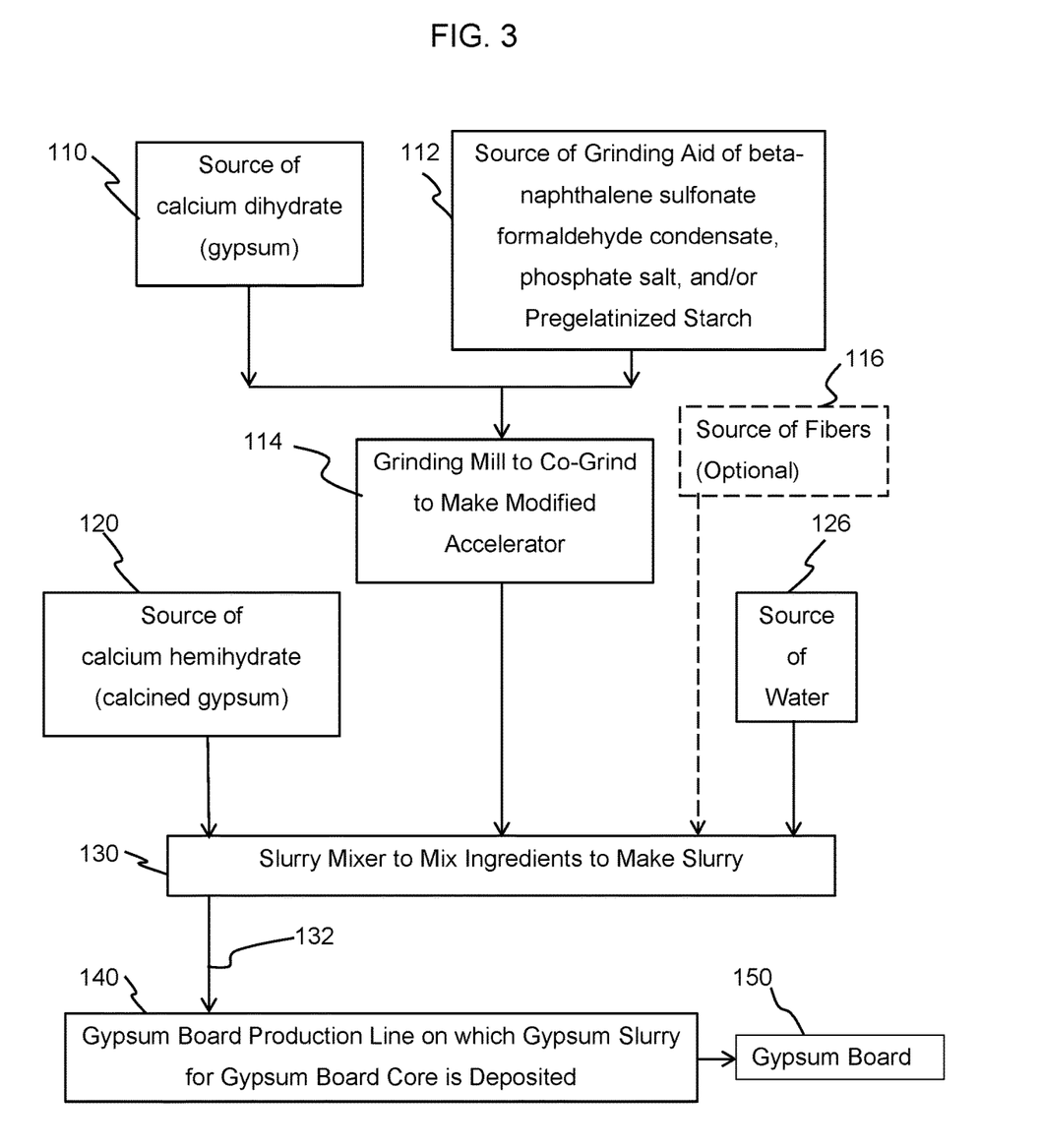
FIG. 3 shows a flow chart for a process to prepare a gypsum-containing product using a set accelerator according to the present invention.

However, in the present invention beta-naphthalene sulfonate formaldehyde condensate (preferably its sodium or calcium salt version) is added in dry solid or dry powder form as a grinding aid during the grinding of the gypsum to make an accelerator that could eventually be used in a process for making a gypsum board from a gypsum slurry. A benefit of using beta-naphthalene sulfonate formaldehyde condensate, rather than dextrose is that it permits one ingredient to replace two ingredients. The beta-naphthalene sulfonate formaldehyde condensate acts as a grinding aid in the grinding process, and then if the ground product is used as an accelerator the beta-naphthalene sulfonate formaldehyde condensate already in the mixture along with the ground gypsum can also perform as a dispersant. Thus, this can replace two ingredients, namely dextrose grinding agent and beta-naphthalene sulfonate formaldehyde condensate dispersant, with one ingredient, namely beta-naphthalene sulfonate formaldehyde condensate grinding agent and dispersant. Compare FIG. 1 showing the conventional process to prepare a gypsum-containing product and FIG. 3 showing the present process to prepare a gypsum-containing product.

Preferred beta-naphthalene sulfonate formaldehyde condensates in the present invention include the condensate sulfonated naphthalene sodium and/or calcium salt and formaldehyde. The most preferred poly-beta-naphthalene sulfonates in the present invention include the condensate of sulfonated naphthalene sodium salt and formaldehyde. The weight average molecular weight of the poly-beta-naphthalene sulfonates typically ranges from about 3,000 to 27,000. An example of a suitable dry solid beta-naphthalene sulfonate formaldehyde condensate sodium salt for use in the present invention is known by the brand name LOMAR D available from GEO Specialty Chemicals, Lafayette, Ind.

The beta-naphthalene sulfonate formaldehyde condensates useful in the present invention have the general structure (I):

wherein n is >2, and wherein M is sodium, potassium, calcium, and the like.

Preferably, the beta-naphthalene sulfonate formaldehyde condensate dispersant will be used as a grinding aid in an amount such that when the co-ground set accelerator comprising the beta-naphthalene sulfonate formaldehyde condensate is added to the gypsum slurry, there will be sufficient beta-naphthalene sulfonate formaldehyde condensate on a dry (water-free) weight basis to be in a range from about 0.1% to about 1.5% by weight based of the weight of dry stucco (calcium sulfate hemi-hydrate) in the gypsum slurry.

Formula (I) shows the condensation reaction of sulfonated naphthalene sodium salt and formaldehyde to make beta-naphthalene sulfonate formaldehyde condensate sodium salt (BNS). The calcium salt would be made by a similar reaction.

wherein n is >2.

Phosphate Salts

Another conventional additive used in various aspects of the gypsum/fiber board making process and now used upstream in the present invention as a grinding aid with gypsum is a phosphate salt selected from one or more of trimetaphosphate phosphate salts, tripolyphosphate salt, and tetra pyrophosphate salts. The trimetaphosphate phosphate salts, tripolyphosphate salts, tetra-pyrophosphate salts are inorganic phosphate salts. Typically they are ammonium, alkali metal or alkaline metal inorganic phosphate salts. Preferably they are sodium, potassium or calcium salts. Sodium trimetaphosphate (STMP), sodium tripolyphosphate (STPP), potassium tripolyphosphate (KTPP), tetrasodium pyrophosphate (TSPP), or tetrapotassium pyrophosphate (TKPP) are more preferred.

Preferably a trimetaphosphate is used, including double salts, that is, trimetaphosphates having two cations. Particularly useful trimetaphosphates include sodium trimetaphosphate, potassium trimetaphosphate, calcium trimetaphosphate, sodium calcium trimetaphosphate, lithium trimetaphosphate, ammonium trimetaphosphate, and the like, or combinations thereof. Sodium trimetaphosphate (STMP) is the most preferred phosphate salt.

A phosphate salt, particularly sodium trimetaphosphate (STMP), is conventionally used to enhance gypsum board strength. Dextrose is conventionally used as a grinding aid. However, the invention replaces all or some dextrose with the phosphate salt to replace the two ingredients dextrose (in grinding) and phosphate salt (in board manufacture) with the one ingredient phosphate salt (in grinding and board manufacture). Thus, in addition to its typical use in board manufacture the invention also uses the phosphate salt as a grinding aid to permit this additive to do "double duty" and thus function more efficiently in the board making process.

Pregelatinized Starch

Pregelatinized starch, including a fine ground pregelatinized corn starch (for example, where >99% of particles pass through a 100 mesh screen) and coarse starch having a larger particle size, is known for its use in gypsum-containing slurries for core strength of the wallboard. However, pregelatinized starch was not used with gypsum in the grinding process to make an accelerator to be added to the gypsum slurry. In an embodiment of the present invention, pregelatinized starch is added in place of all or part of dextrose to the grinding process and co-ground with gypsum to make the accelerator. The pregelatinized starch based accelerator has similar efficiency as a conventional dextrose based HRA. The pregelatinzed starch co-ground with gypsum maintains its function as a core strength additive and reduces or eliminates the cost of using expensive dextrose or unpregelatinized (also known as non-pregelatinized) starch in the slurry or adding a separate amount of pregelatinized starch downstream to the slurry.

A preferred pregelatinized starch includes, but not limited to, pregelatinized corn flour, for example pregelatinized corn flour available from Bunge, St. Louis, Mo., having the following typical analysis: moisture 7.5%, protein 8.0%, oil 0.5%, crude fiber 0.5%, ash 0.3%; having a green strength of 0.48 psi; and having a loose bulk density of 35.0 lb/ft3. Other useful pregelatinized starches may include, but are not limited to, pregelatinized rice starch and pregelatinized wheat starch.

Pregelatinized starch can be used in an amount up to about 40% by weight, based on the weight of the gypsum used in the grinding process, and preferably in an amount of from about 0.5% to about 10% percent by weight of the gypsum used in the grinding process.

Gypsum (Calcium Sulfate Dihydrate)

The gypsum (calcium sulfate dihydrate) used in the grinding process may be any natural or synthetic gypsum dihydrate material of either high or low grade and of appropriate feed size for grinding, Freshly mined gypsum, such as high-grade landplaster, which is 80 or more weight % dihydrate, is particularly suitable. The dihydrate may contain impurities and inert materials without substantial detriment to its usage in the set accelerator. However, impurities known to be detrimental to the setting time of calcined gypsum, such as phosphoric acid, should be avoided or minimized. Dihydrate prepared from the hydration of calcium sulfate hemihydrate, such as scrap gypsum board, may also be suitable for use in the set accelerator. The amount of dihydrate used should be in the range of from about 20% to about 95% by weight based on the weight of the dry set accelerator.

Calcined Gypsum (Calcium Sulfate Hemihydrate)

The set accelerator of the present invention may be employed to accelerate setting of calcined gypsum (calcium sulfate hemihydrate) to make gypsum slurry for gypsum products, for example a gypsum board. The calcined gypsum can be in the form and concentrations typically found useful in the conventional gypsum slurry. It may be alpha calcium sulfate hemihydrate, beta calcium sulfate hemihydrate, water-soluble calcium sulfate anhydrite, or mixtures of any or all thereof, from natural or synthetic sources. In a preferred embodiment alpha calcium sulfate hemihydrate is used for its yield of set gypsum having relatively high strength. In another preferred embodiment beta calcium sulfate hemihydrate or a mixture of beta calcium sulfate hemihydrate and water-soluble calcium sulfate anhydrite are used.

The dry (water free) set accelerator itself typically has an absence of calcium sulfate hemihydrate, or comprises calcium sulfate hemihydrate in a very low level, e.g., less than 1 wt. % based on the weight of the dry calcium sulfate dihydrate. Desirably the present set accelerator is characterized by the absence of calcium sulfate hemihydrate or substantial lack of calcium sulfate hemihydrate or a very low amount of calcium sulfate hemihydrate.

Making Set Accelerator

The grinding aid of the invention may include the polynaphthalene sulfonate, trimetaphosphate phosphate, tripolyphosphate, tetra-pyrophosphate, and pregelatinized starch, and/or pregelatinized starch, together with or in the absence of other conventionally used additives. For example, the grinding aid may include beta-naphthalene sulfonate formaldehyde condensate, preferably BNS, with phosphate, preferably STMP, optionally with a conventionally used non-pregelatinized starch (when the specification simply refers to starch it is non-pregelatinized starch unless otherwise indicated). The grinding aid may include pregelatinized starch, optionally with STMP. The grinding aid may also include BNS and/or pregelatinized starch with STMP, optionally with a conventionally used non-pregelatinized starch and/or dextrose. The set gypsum accelerator, in an embodiment, may consist of a mixture of the dry calcium sulfate dihydrate, BSN and/or pregelatinzed starch, STMP, optionally with a conventional non-pregelatinized starch and/or dextrose.

The set accelerator may be stored for extended periods, and subsequently added to the gypsum slurry. In this case, it is preferred that the accelerator comprises a coating agent to prevent the finely ground gypsum from becoming inactive over time. Any coating agent known in the art may be used that possesses certain properties, which includes but not limited to, starch, sugar (e.g., glucose, sucrose, or dextrose) boric acid, or a combination of the compounds. The amount of coating agent may range from about 5% to about 25% based on the weight of the dry calcium sulfate dihydrate. The coating agent may be co-ground with the calcium sulfate dihydrate to achieve size reduction and to promote intimate association between the coating agent and the gypsum.

Grinding may be done by any grinding apparatus known in the art. A preferred grinding apparatus is a ball mill. Preparation of ground mixtures of calcium sulfate dihydrate and coating agents are known in the art, e.g., in U.S. Pat. No. 3,573,947. The coating may be melted over the surface of the calcium sulfate dihydrate to maintain the activity of the ground gypsum over long periods of time.

The amount of the grinding aid used in preparing the set accelerator may be an amount enough to replace all or part of dextrose included in a conventional set accelerator. It may vary when the same material is required to be added to the gypsum slurry for performing another function. Generally, if one or more of beta-naphthalene sulfonate formaldehyde condensate or phosphate salt is used as grinding aid then each may be included in an amount of about 1 to 10 parts by weight based on 100 parts by weight of the dry calcium sulfate dihydrate, with a preferred range being about 3 to about 8 parts by weight. However, pregelatinized starch may be included in an amount of up to about 60 parts by weight based on 100 parts by weight of the dry calcium sulfate dihydrate, preferably up to about 40 parts by weight, more preferably about 4 to about 40 parts by weight.

The following TABLE A lists in wt. % preferred compositions for the set accelerator.

TABLE A

| Ingredients in Grinding Aid | Broad (parts by weight) | Preferred (parts by weight) | More Preferred (parts by weight) |
| --- | --- | --- | --- |
| Gypsum (dry calcium sulfate dihydrate) | 100 | 100 | 100 |
| Beta-naphthalene sulfonate formaldehyde condensate if only grinding aid | 1-10 | 3-8 | 4-6 |
| Phosphate salt if only grinding aid | 1-10 | 3-8 | 4-6 |
| Pregelatinized starch if only grinding aid | 1-60 | 1-40 | 4-40 |
| Total of beta-naphthalene sulfonate formaldehyde condensate, Phosphate salt, Pregelatinized starch | 1-60 | 3-50 | 4-50 |

The above amounts can also be used in blends of one or more of these grinding aids. If there is a blend the lower limit for the total of beta-naphthalene sulfonate formaldehyde condensate, phosphate salt, pregelatinized starch is the sum of the lower limits for each of these grinding aids present. The invention includes compositions comprising one or more grinding aids of TABLE A wherein each grinding aid is in its respective range from the same column. For example, 1-10 parts by weight beta-naphthalene sulfonate formaldehyde condensate can used together with 1-10 parts by weight phosphate salt. The invention also includes compositions comprising one or more grinding aids of TABLE A wherein, if there is more than one grinding aid, one grinding aid may be present in a range from one column and one or more other grinding aids may be present in a respective range from another respective column. For example, 1-10 parts by weight beta-naphthalene sulfonate formaldehyde condensate can used together with 3-8 parts by weight phosphate salt. Thus, a preferred or more preferred range in TABLE A for a grinding aid is preferred or more preferred for the overall invention.

The grinding aid and the set accelerator prepared with the grinding aid may have an absence of dextrose, or comprise dextrose in a very low level, e.g., less than 0.1 wt. % based on the weight of the dry calcium sulfate dihydrate. Desirably the present set accelerator is characterized by the absence of dextrose or substantial lack of dextrose or a very low amount of dextrose.

The grinding aid and the set accelerator prepared with the grinding aid may have an absence of sugar, or comprise sugar in a very low level, e.g., less than 0.1 wt. % based on the weight of the dry calcium sulfate dihydrate. Desirably the present set accelerator is characterized by the absence of sugar or substantial lack of sugar or a very low amount of sugar.

The grinding aid and the set accelerator prepared with the grinding aid may have an absence of starch (this is non-pregelatinized starch), or comprise starch in a very low level, e.g., less than 0.1 wt. % based on the weight of the dry calcium sulfate dihydrate. Desirably the present set accelerator is characterized by the absence of starch or substantial lack of starch or a very low amount of dextrose.

The grinding aid and the set accelerator prepared with the grinding aid may have an absence of dextrose, sugar, and starch (this is non-pregelatinized starch), or comprise dextrose, sugar, and starch in a very low level, e.g., less than 0.1 wt. % each based on the weight of the dry calcium sulfate dihydrate. Desirably the present set accelerator is characterized by the absence of starch or substantial lack of starch or a very low amount of dextrose.

The dry calcium sulfate dihydrate and the grinding aid are co-ground by any conventional method known in the art, e.g., ball milling, to have a desired particle size distribution prior to use. The particle size distribution of the resulting dry loose finely ground particles are generally about 1 to about 20 μm. The resulting loose finely ground particles may comprise ground dry calcium sulfate dihydrate in combination or coated with the grinding aid of naphthalene sulfonate, phosphate, and/or pregelatinized starch.

Making Gypsum Products

FIG. 1 shows a schematic flow chart of an apparatus for preforming a conventional process for making gypsum board using conventional set accelerator. In the process gypsum from a source calcium dihydrate (gypsum) 10, such as a storage bin) and starch (non-pregelatinized) or dextrose from a source of starch (non-pregelatinized) or dextrose 12 feed a grinding mill 14. In the grinding mill 14 the gypsum and starch (non-pregelatinized) or dextrose are co-ground to make set accelerator. The set accelerator feeds a slurry mixer 30 where it mixes with calcium hemihydrate (also known as calcined gypsum or stucco) from source of calcium hemihydrate 20, dispersant, e.g., beta-naphthalene sulfonate formaldehyde condensate, from a source of dispersant 22, optional additives, e.g., trimetaphosphate salt, tripolyphosphate salt, or tetra pyrophosphate salt, and/or pregelatinized starch, from source of optional additives 24, and water from a source of water 26. The set accelerator accelerates the setting of the calcium sulfate hemihydrate. If it is desired for the gypsum board to also have fibers, such as cellulosic, glass, polymer, or metal fibers, distributed in its gypsum core then fibers from a source of fibers 16 may also feed into the slurry mixer 30. A slurry stream 32 discharges from the slurry mixer 30 and is then fed to a headbox (not shown) of a gypsum board production line 40. From the headbox the slurry is deposited onto a forming belt (not shown) of the gypsum board production line 40 as known in the art. If it is desired to make a gypsum board 50 having a facing sheet or a backing sheet, then the slurry is deposited on a sheet of paper or other facing or backing material on the belt. If it is desired to make gypsum board 50 having a facing sheet and a backing sheet, then the slurry is deposited on a sheet of paper or other facing or backing material on the belt and another sheet of paper or other facing or backing material is placed over the slurry as it is conveyed along the forming belt. The slurry is conveyed on the belt to be de-watered, dried, set, and cut to form the gypsum board 50.

FIG. 2 shows the gypsum board 50 made according to the process of FIG. 1 from the gypsum slurry. The board 50 has a front facing sheet 52, typically paper or mesh, a gypsum core 54 made from the gypsum slurry, and a backing sheet 56, typically paper or mesh. Versions of the board made with fibers from the optional source of fibers 16 may omit the front facing sheet and/or backing sheet.

FIG. 3 shows a schematic flow chart of an apparatus for preforming a process for making gypsum board using set accelerator of the present invention. In the process gypsum from a source calcium dihydrate (gypsum) 110, such as a storage bin, and grinding aid from a source of the grinding aid 112 feed a grinding mill 114. The grinding aid is one or more of the beta-naphthalene sulfonate formaldehyde condensate, phosphate salt, e.g., trimetaphosphate phosphate salt, tripolyphosphate salt, or tetra pyrophosphate salt, and/or pregelatinized starch. Optionally (not shown) the grinding aid may additionally include conventional grinding aid, for example starch (non-pregelatinized) and/or dextrose. Desirably the grinding aid does not additionally include conventional grinding aid, for example starch (non-pregelatinized) and/or dextrose.

In the grinding mill 114 the gypsum and grinding aid are co-ground to make set accelerator. The set accelerator feeds a slurry mixer 130 where it mixes with calcium hemihydrate (also known as calcined gypsum or stucco) from source of calcium hemihydrate 120 and water from a source of water 126. If it is desired for the gypsum board to also have fibers, such as cellulosic, glass, polymer, or metal fibers, distributed in its gypsum core then fibers from a source of fibers 116 may also feed into the slurry mixer 130. A slurry stream 132 discharges from the slurry mixer 130 and is then fed to a headbox not shown of a gypsum board production line 140. From the headbox the slurry is deposited onto a forming belt (not shown) of the gypsum board production line 40 as is known in the art. If it is desired to make a board 150 having a facing sheet or a backing sheet, then the slurry is deposited on a sheet of paper or other facing or backing material on the belt. If it is desired to make a board 150 having a facing sheet and a backing sheet, then the slurry is deposited on a sheet of paper or other facing or backing material on the belt and another sheet of paper or other facing or backing material is placed over the slurry as it is conveyed along the forming belt. The slurry is conveyed on the belt to be de-watered, dried, set, and cut to form the gypsum board 150.

The present gypsum set accelerator is added to aqueous gypsum slurry formed by mixing calcium sulphate hemihydrate (calcined gypsum) and water, with other optional additives, to accelerate the setting reaction of the calcined gypsum. The accelerator may be used in any gypsum slurry known in the art for which rapid setting is desired, optionally with other additives to improve certain characteristics of the set gypsum. Especially suitable is a gypsum slurry that dries to a uniform core, uniform thickness which is machinable and dimensionally stable. Fiberglass reinforced compositions may be used, such as those used for decorative panels and columns.

The method of contacting the set accelerator with the slurry in the slurry mixer 130 depends on the use being considered. When used with a gypsum slurry that does not have a particularly fast set time, the set accelerator can be added and mixed using any conventional technique. If, for example, a decorative panel is made using a mold, the slurry and set accelerator can be poured together in a batch process and quickly poured into the mold. The aqueous slurry mixture obtained may be placed on a paper sheet allowing it to set to obtain a gypsum board.

Water added to the slurry mixer 130 to make the slurry 132 may be in any amount that makes a flowable slurry. The amount of water to be used varies greatly according to the application with which it is being used, the exact dispersant being used, the properties of the stucco, and the additives being used. The water to stucco weight ratio ("WSR") with wallboard is 0.4-1.5:1, preferably 0.6-1.4:1, more preferably 0.4-0.8:1. Flooring compositions preferably use a WSR from about 0.17 to about 0.45, preferably from about 0.17 to about 0.34. Moldable or castable products preferably use water in a WSR of from about 0.4 to about 1.5, preferably from about 0.4 to about 0.6. The WSR can be reduced by 0.1 or more in laboratory tests based on the moderate addition of the linear polycarboxylate dispersants. In the invention the water to calcined gypsum (calcium sulfate hemihydrate) weight ratio of the slurry employed to make the board is less than 0.8.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

The gypsum slurry 132 may include additives in the practice of the invention in customary amounts to impart desirable properties and to facilitate manufacturing, such as, for example, aqueous foam, set retarders, recalcination inhibitors, binders, adhesives, secondary dispersing aids, leveling or non-leveling agents, thickeners, bactericides, fungicides, pH adjusters, colorants, reinforcing materials, fire retardants, water repellants, fillers and mixtures thereof.

The gypsum slurry 132 may also include other additives to modify one or more properties of the final products. In this case, the additives are used in the manner and amounts as known in the art. Concentrations are reported in amounts per 1000 square feet of finished board panels ("MSF"). Starches are used in amounts from about 3 to about 20 lbs./MSF (14.6 to 97.6 g/m$^2$) to increase the paper bond and strengthen the product. Glass fibers are optionally added to the slurry in amounts of at least 11 lb./MSF (54 g/m$^2$). Up to 15 lb./MSF (73.2 g/m$^2$) of paper fibers are also added to the slurry. Wax emulsions are added to the gypsum slurry in amounts up to 90 lb./MSF (0.4 kg/m$^2$) to improve the water-resistance of the finished gypsum board panel.

The aqueous slurry prepared by the method of the present invention may be deposited on a cover (e.g., paper) sheet to allow it to set and to obtain a gypsum board. Preferably, the deposition according to the process of FIG. 3 comprises making a gypsum board 150 of a core of set gypsum-containing material, made from the gypsum slurry which includes the set accelerator of the present invention, sandwiched between cover sheets, namely a front facing sheet and a rear sheet in the same arrangement as the conventional board of FIG. 2. The front facing sheet is typically paper or mesh and the rear sheet is typically paper or mesh. A method of the present invention produces the above described gypsum board or fiber board comprising the core of set gypsum sandwiched between cover sheets of paper or other material. Preferably, the board is prepared by forming a flowable slurry comprising calcined gypsum (calcium sulfate hemihydrate), water, the set accelerator comprising a mixture of ground dry calcium sulfate dihydrate and one or more of naphthalene sulfonate, phosphate, and pregelatinized starch added early as a grinding aid, optionally with other conventional additives, and then depositing it between cover/paper sheets, and allowing the resultant assembly to set and dry. The slurry is deposited onto a first paper sheet then a second paper sheet is applied over the setting slurry. The slurry preferably sets at least 50% within 10 minutes in the presence of the set accelerator according to the invention.

Before the deposition onto a mold (not shown) or the forming belt of the gypsum board production line 140, additives such as a cellulosic fiber from the source of fibers 116 may be added to the slurry in the slurry mixer 130 to form a fiber board. Typically, if fibers are added, they are cellulosic fibers added to the gypsum slurry to form a fiberboard. Versions of the board 150 made with fibers from the optional source of fibers 116 may omit the front facing sheet and/or rear sheet, if desired.

The gypsum board obtained by the method of the present invention comprises a gypsum core material comprising a mixture of calcium sulfate dihydrate and the set accelerator of the present invention comprising a mixture of ground dry calcium sulfate dihydrate and one or more of naphthalene sulfonate, phosphate, and pregelatinized starch added early as a grinding aid. If desired to produce a gypsum board of lighter weight, the slurry of the invention may further comprise aqueous foam of air bubbles. Such slurry composition and method provide a board of lighter weight, because the bubbles of aqueous foam result in corresponding air voids in the set gypsum core of the resultant board. Preferably, the gypsum slurry may have 5 to 70 volume percent air bubbles, more preferably 10 to 70 volume percent air, most preferably 20 to 60 volume percent air. The gypsum board may have a higher volume percent of voids than the slurry from which is made has a volume of bubbles. This is because additional voids (water voids) result from spaces between particles when water is removed as the slurry sets to form the board. Thus, the gypsum board may have a total void volume of 10 to 92 volume percent, more preferably 25 to 90 volume percent, most preferably 30 to 85 volume percent. If air is added in the method of the invention the calcium sulfate hemihydrate and water are mixed to form the slurry and then the air is added by entraining air into the slurry and/or by adding foam water to the slurry.

The gypsum slurry prepared by the present invention may be practiced to prepare gypsum-containing products according to other conventional methods known in the art.

A test for the efficacy of the grinding aid for use in making a gypsum set accelerator, containing a single or multiple components according to the present invention, may be conducted by any known method for testing set accelerator efficiency.

For instance, a batch of, e.g., 100 g or 500 pounds of a mixture of landplaster (calcium sulfate dihydrate) and the designated amount of BNA or BNS/STRIP or BNS/STMP/starch are ground together in a batch-type ball mill until the particle size is sufficiently reduced so that the mixture exhibits a certain surface area, e.g., at least 5,000 cm$^2$/g, or preferably greater than 10,000 cm$^2$/g, as measured by a Fischer Sub-sieve Sizer. Each accelerator composition may be tested in a laboratory procedure developed for comparing the properties of various gypsum set accelerators. In carrying out the test, in each case an amount of 180 cc of distilled water may be placed in a 2-speed Waring Blender operated at high speed. A mixture of 200 g Southard molding plaster and 0.1 g of an accelerator composition may be added to the blender and the lid closed. The slurry may be mixed for a certain time, e.g., several seconds and then emptied into an insulated plastic foam cup, and temperature vs. time is measured at intervals to obtain a temperature rise set (TRS) curve, From the curve the time at which the temperature stopped rising is determined and recorded as the TRS. Samples of each accelerator is then baked at about 220° F. for several hours, e.g., 7 hours, and retested in the same manner. The remaining samples of accelerator are exposed for, e.g., 44 hours at, e.g., 80° F. and at about 80% relative humidity and then tested by the same procedure described above.

The following examples are presented to further illustrate some preferred embodiments of the invention and to compare them with conventional methods and compositions outside the scope of the invention. The invention is not limited by the following examples but rather is defined by the claims appended hereto.

EXAMPLES

Example 1: BNS Based Heat Resistant Accelerator (HRA)

100 g of synthetic gypsum (calcium sulfate dihydrate) was dried for overnight, and thereto was added 5 g of sodium salt of beta-naphthalene sulfonate formaldehyde condensate (BNS) (commercially obtained, LOMAR® D). The mixture was co-ground with in a planetary ball mill for 10 min to obtain dry loose finely ground particles.

BNS is also a dispersant so it also can reduce water use. To evaluate the function of the BNS as dispersant that was early co-ground with the gypsum as a grinding aid, a comparison test was conducted with a regular HRA prepared in the same method but with a mixture of the synthetic gypsum and dextrose, and another regular HRA prepared by the same method but with the synthetic gypsum and starch. Each of the three HRAs (regular HRA with dextrose, called "dextrose based HRA," BNS based HRA according to the present invention, and pre-gelatinized starch HRA) was added to the aqueous slurry formed with calcined gypsum, water, and other ingredients shown in Table 1 below, respectively. A dispersant was added in the slurry of dextrose based HRA and the slurry of pre-gelatinized starch HRA (starch based HRA), as shown in Table 1 below at the first and third columns, and no dispersant was separately added in the slurry of BNS based HRA, as shown in TABLE 1 below at the second column.

In Table 1, slump is measured for the gypsum slurry's fluidity or workability. Slump is a measurable quantity that assists in determining whether there is too much water is in the gypsum slurry. For example, a slurry sample is poured into a damp 2"×4" cylinder placed on a plastic sheet, slightly overfilling the cylinder. Excess material is screened from the top, and then the cylinder is lifted up smoothly, allowing the slurry to flow out the bottom, making the patty. The patty is measured (±⅛") in two directions 90° apart, and the average reported as the patty diameter. Use of the set accelerator may lead stiffening of the slurry. Stiffening time is measured as the elapsed time from the beginning of the stucco soak to when a Vicat needle drawn through the slurry left a definite line that did not flow back. The stiffening time is a measure of the hydration of the slurry.

TABLE 1

Function as dispersant

| | Mixing Number | | |
|---|---|---|---|
| | 1 (comparative) | 2 | 3 |
| Stucco (g) | 400 | 400 | 400 |
| HRA (ground with 5% dextrose) (g) | 4 | | |
| HRA (ground with 5% BNS) (g) | | 4 | |
| HRA (ground with 5% Pre-gelatinized starch) (g) | | | 4 |
| Pre-gelatinized Starch (g) | 12.6 | 12.6 | 8.6 |
| Mixing Water (g) | 350 | 350 | 350 |
| Retarder VERSENEX 80 1% solution (H₂O in Retarder) (g) | 12 (11.88) | 12 (11.88) | 12 (11.88) |
| 40% BNS Dispersant (g) | 1.04 | 0 | 1.04 |
| Slump (inches) | 6¼ | 5⅝ | 6⅛ |
| Stiffening (seconds) | 47 | 42 | 50 |
| Total Water (g) (mixing water + water in other liquid ingredients) | 361.88 | 361.88 | 361.88 |
| WSR (water stucco weight ratio) | 0.90 | 0.90 | 0.90 |
| BNS Active (100% active)(g) | 0.4 | 0.2 | 0.4 |

As shown by the data in TABLE 1, the aqueous slurry added with the BNS based HRA ($2^{nd}$ column) according to the present invention, with no separate dispersant, showed excellent dispersion comparable to the other two regular HRAs ($1^{st}$ and $3^{rd}$ columns). This confirms the BNS added upstream as a grinding aid to form a co-ground accelerator with the gypsum also functions as a dispersant in the slurry mixture when the accelerator was added to the slurry, thereby avoiding using a separate dispersant in downstream and reducing cost for preparing the gypsum-containing product.

The hydration profile of the BNS based HRA prepared according to the present invention was compared with regular HRA (dextrose based HRA), and the results are shown in TABLE 2.

TABLE 2

Hydration profile

| | Dextrose HRA* | BNS HRA** |
|---|---|---|
| Soak Time (seconds) | 10 | 10 |
| Mix Time (seconds) | 10 | 10 |
| Initial Slurry Temp (° F.) | 74.4 | 74.4 |
| Two/Three Minute Rise Temp (° F.) | 6.9 | 5.9 |
| Max RR Begin Time (minutes) | 2.92 | 3.33 |
| Max RR End Time (minutes) | 3.42 | 3.83 |
| Max Rate of Rise Temp (° F.) | 8.3 | 7.3 |
| Time to 50% Hydration (minutes) | 2.75 | 2.92 |
| Time to 98% Hydration (minutes) | 6.08 | 6.5 |
| Time to 10% Hydration (minutes) | 0.58 | 0.58 |
| Time from 50 to 100% Hydration (minutes) | 5.42 | 5.92 |
| Final Set Time (minutes) | 8.17 | 8.83 |
| Final Set Temp (° F.) | 101.7 | 101.8 |
| Total Temp Rise (° F.) | 27.2 | 27.5 |
| Hydration at 1422 feet of board production line (Belts) | 42.78% | 39.34% |
| Hydration at 1690 feet of board production line (prior to knife) | 53.80% | 48.48% |
| Hydration at 1850 feet of board production line (entering kiln) | 61.04% | 54.49% |

*HRA ground with 1% dextrose
**HRA ground with 1% BNS

As shown by TABLE 2, the hydration of the gypsum slurry prepared with the present set accelerator had similar time for 50% and 98% hydration, as well as the time for final set.

Example 2: Pregelatinized Starch Based HRA

Pregelatinized starch (up to 40%, gypsum basis) was co-ground with dried gypsum in a planetary ball mill for 10 min to make pregelatinized starch based HRA. Dextrose (5%, gypsum basis) was co-ground with dried gypsum as dextrose based HRA control.

The HRA efficiency was evaluated by a TRS method. Stucco slurry was prepared by mixing stucco, HRA (1%, stucco basis), and water (water to stucco ratio of 1.00). The time to 50% hydration was used to represent the efficiency of HRA.

Compressive strength of foamed gypsum disk samples: Gypsum slurry was prepared according to the formulation shown in TABLE 4. Appropriate amount of air was added into the slurry for a final dry density of 31 pcf. The disk samples were dried at 110° F. overnight. The compressive strength of the foamed disks was tested.

TABLE 3

Slurry formulation of foamed gypsum disk.

| Ingredients | grams | grams |
| --- | --- | --- |
| Stucco | 400 | 400 |
| HRA (Heat Resistant Accelerator) | 4 (HRA ground with 5% dextrose) | 4 (HRA ground with 5% pre-gelatinized starch) |
| pre-gelatinized starch | 8 | 6.4 |
| STMP 10% solution | 8 | 8 |
| BNS Dispersant | 2 | 2 |
| Retarder VERSENEX 80 1% solution | 10 | 10 |
| Gaging water | 330 | 330 |

Regarding HRA efficiency, it was shown that the time to 50% hydration for pregelatinized starch based HRA and dextrose based HRA are same (3.5 min). The time to 50% hydration for ground gypsum was longer (4.33 min). The hydration rate indicates that pregelatinized starch based HRA had similar efficiency as dextrose based HRA. The time rise curve was shown in FIG. 4, where comparative temperature rise of stucco slurries containing a set accelerator according to the present invention (i.e., a gypsum co-ground with pregelatinized starch), compared to a conventional set accelerator (i.e, ground gypsum alone); ground gypsum with dextrose).

Figure 4:
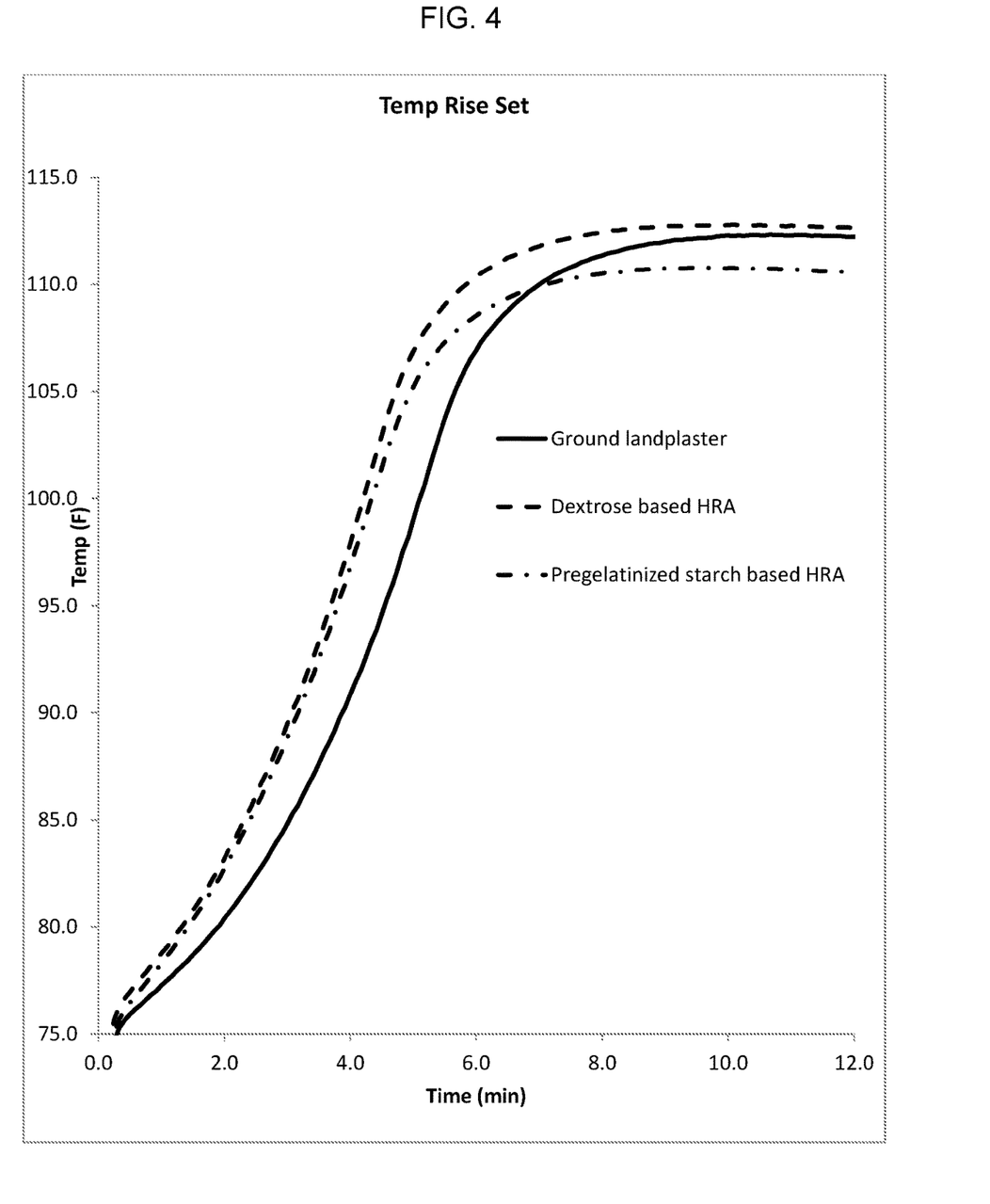
FIG. 4 shows a graph for temperature rise of stucco slurries containing a gypsum set accelerator according to one aspect of the present invention, e.g., pregelatinized starch based HRA, compared to conventional set accelerators, e.g., finely ground gypsum and dextrose based HRA for data of Example 2.

FIG. 4 shows data obtained from tests comparing the present set accelerators with conventional set accelerator. In each case 0.1 g accelerator composition was utilized with 200 g stucco. These values were arbitrarily chosen and maintained constant for purposes of the test. In practice in forming plasterboard, other varying proportions of accelerator composition to stucco may be utilized depending on the magnitude of the set period desired.

The properties desired in good gypsum set accelerator are, first of all, that the accelerator be one which delays setting of the gypsum slurry to which it is added for about 3 minutes, permitting the slurry to be formed into board sheet. It is then desired that setting take place rapidly and reach completion as measured by the above-described procedure within a period of not more than about 20 minutes and preferably not more than 10 minutes, as determined by termination of temperature rise.

Regarding compressive strength of foamed gypsum core, the foamed gypsum disks containing a total of 2% pregelatinized starch with pregelatinized starch HRA had a compressive strength of 467 psi at a density of 31 pcf. The foamed disks containing same amount of total pregelatinized starch with dextrose based HRA showed a compressive strength of 451 psi at a density of 31 pcf. This result indicates that the pregelatinized starch co-ground with gypsum maintains its core strength improvement function.

As such, co-grinding part of the pregelatinized starch with gypsum can eliminate the need for dextrose to make HRA for wallboard production and reduce cost for wallboard production.

Example 3: BNS/STMP Based HRA and BNS/STMP/Starch Based HRA

A combination of BNS and STMP, and a combination of BNS, STMP and starch, i.e., a conventional non-pregelatinized starch, as shown in TABLE 5 below, were respectively used to replace dextrose, functioning as a grinding aid and heat resistant agent, in preparing a set gypsum accelerator. This was done by co-grinding the dry gypsum with the combination of the grinding aid using a Fritsch planetary mill for 10 minutes of grinding. Since BNS, STMP and a conventional starch have already been used in the gypsum board preparation as part of ingredients, addition of these ingredients in the HRA at an early stage of grinding eliminates dextrose (cost saving) and enhance the gypsum board strength (performance improvement).

TABLE 5

Preparation of Modified HRAs with Different Ingredients

| Ingredients | Regular HRA (HRA ground with 5 wt. % dextrose) | BNS/STMP based HRA(HRA ground with 3.5 wt. % BNS + 3.5 wt. % STMP) | BNS/STMP/ starch based HRA (HRA ground with 3.5 wt. % BNS + 3.5 wt. % STMP + 3.5 wt. % pre-gelatinized starch) |
| --- | --- | --- | --- |
| Dried Gypsum (wt. %) | 100 | 100 | 100 |
| Dextrose (wt. %) | 5 | | |
| BNS (wt. %) | | 3.5 | 3.5 |
| STMP (wt . %) | | 3.5 | 3.5 |
| Starch (wt. %) (Pre-gelatinized starch) | | | 3.5 |

The modified HRAs (BNS/STMP based HRA and BNS/STMP/starch based HRA) prepared with different ingredients of grinding aid were respectively added to an aqueous slurry and the properties of the stucco in wet stage were evaluated. BNS/STMP based HRA showed the same performance when BNS and STMP used as grinding aid to replace dextrose in regular HRA. BNS/STMP/starch based HRA showed slightly lower efficacy as the slump reduced about ½ inch.

Figure 5:
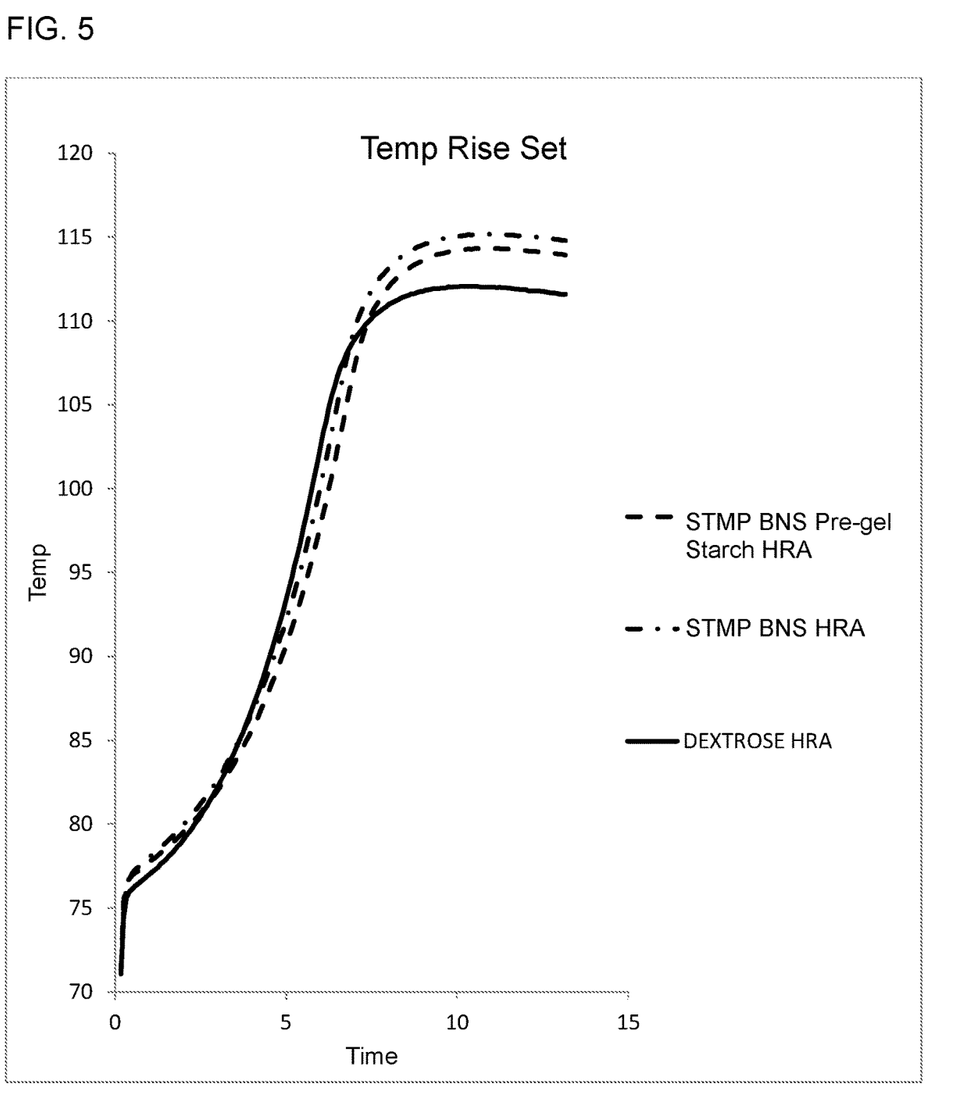
FIG. 5 shows a graph of temperature rise of stucco slurries containing a set accelerator according to one aspect of the present invention, e.g., BNS/STMP based HRA and BNS/STMP/pre-gelatinized starch based HRA, compared to a conventional set accelerator, e.g., dextrose based HRA for data of Example 3.

FIG. 5 shows data obtained from tests comparing the present set accelerators with conventional set accelerator. In each case 0.1 g accelerator composition was utilized with 200 g stucco. These values were arbitrarily chosen and maintained constant for purposes of the test. In practice in forming plasterboard, other varying proportions of accelerator composition to stucco may be utilized depending on the magnitude of the set period desired.

The evaluation conducted with the different additions of the grinding aid, as illustrated by FIG. 5, demonstrated the BNS/STMP based HRA showed the highest total heat in hydration in terms of temperature rise, and the regular HRA (dextrose based HRA) showed the lowest total heat in hydration.

What is claimed is:

1. A gypsum set accelerator comprising dry loose finely around particles, comprising a mixture of
dry solid particles of ground dry calcium sulfate dihydrate and a grinding aid comprising dry solid particles of beta-naphthalene sulfonate formaldehyde condensate sodium salt and/or beta-naphthalene sulfonate formaldehyde condensate calcium salt, and the grinding aid comprises dry solid particles of sodium trimetaphosphate,
wherein the calcium sulfate dihydrate was co-ground with the grinding aid.

2. The gypsum set accelerator of claim 1, wherein the gypsum set accelerator comprises one or more of:
1-10 parts by weight said beta-naphthalene sulfonate formaldehyde condensate per 100 parts by weight calcium sulfate dihydrate; and
1-10 parts by weight said sodium trimetaphosphate per 100 parts by weight calcium sulfate dihydrate.

3. The gypsum set accelerator of claim 1, wherein the gypsum set accelerator comprises:
2-8 parts by weight said beta-naphthalene sulfonate formaldehyde condensate per 100 parts by weight calcium sulfate dihydrate; and/or
3-8 parts by weight said sodium trimetaphosphate per 100 parts by weight calcium sulfate dihydrate.

4. The gypsum set accelerator of claim 1, wherein the grinding aid further comprises pregelatinized starch.

5. The gypsum set accelerator of claim 1, wherein the grinding aid further comprises a pregelatinized starch, wherein the pregelatinized starch is an amount of up to about 40% by weight based on the weight of the calcium sulfate dihydrate.

6. The gypsum set accelerator of claim 4, wherein the grinding aid comprises less than 0.1 wt. % dextrose based on the weight of the dry calcium sulfate dihydrate.

7. The gypsum set accelerator of claim 1, wherein the gypsum set accelerator has an absence of calcium sulfate hemihydrate.

8. The gypsum set accelerator of claim 1, consisting of:
the calcium sulfate dihydrate,
the grinding aid consisting of:
the dry solid particles of beta-naphthalene sulfonate formaldehyde condensate and the dry solid particles of trimetaphosphate salt, and
optionally dextrose and/or optionally non-pregelatinized starch.

9. A method of preparing the gypsum set accelerator of claim 1, comprising co-grinding dry the calcium sulfate dihydrate with the grinding aid.

10. The method of claim 9,
wherein the grinding aid comprises the beta-naphthalene sulfonate formaldehyde condensate sodium salt and the sodium trimetaphosphate.

11. The method of claim 9, wherein the grinding aid further comprises pregelatinized starch.

12. The method of claim 9, wherein the co-grinding is performed by ball milling.

13. A method, comprising:
mixing water, calcium sulfate hemihydrate, and the gypsum set accelerator of claim 1 to make an aqueous slurry; and
depositing the aqueous slurry on a paper sheet and allowing the aqueous slurry to set to obtain a gypsum board.

14. The method of claim 13, wherein the gypsum set accelerator comprises:
2-8 parts by weight said Beta-naphthalene sulfonate formaldehyde condensate per 100 parts by weight calcium sulfate dihydrate; and/or
3-8 parts by weight said sodium trimetaphosphate per 100 parts by weight calcium sulfate dihydrate.

15. The method of claim 13,
wherein the water, the calcium sulphate hemihydrate, the gypsum set accelerator, and a cellulosic fiber are mixed to form the aqueous slurry, and
further comprising depositing the aqueous slurry on a paper sheet and allowing the slurry to set to obtain a fiberboard.

* * * * *